United States Patent
Purtell

[11] 3,888,281
[45] June 10, 1975

[54] ONE WHEEL PULL-TYPE IRRIGATION SYSTEM

[75] Inventor: Rufus J. Purtell, Brownfield, Tex.
[73] Assignee: Tri-Matic, Inc., Brownfield, Tex.
[22] Filed: Nov. 2, 1973
[21] Appl. No.: 412,501

[52] U.S. Cl. ............... 137/344; 239/212; 280/43; 301/104
[51] Int. Cl. ............ A01g 25/02; B05b 15/06
[58] Field of Search ............ 137/344; 239/177, 212, 239/213; 280/43, 179 R; 301/104

[56] References Cited
UNITED STATES PATENTS

| | | | |
|---|---|---|---|
| 2,896,859 | 7/1959 | Price | 137/344 X |
| 3,386,464 | 6/1968 | Purtell | 137/344 |
| 3,448,927 | 6/1969 | Blair | 137/344 X |

*Primary Examiner*—Henry T. Klinksiek
*Attorney, Agent, or Firm*—Wendell Coffee

[57] ABSTRACT

The wheels on a pull-type wheel lateral irrigation system are mounted one to the vehicle and on opposite sides of the pipe. The torque in the pipe between wheels keeps the vehicles upright. The system is designed so that two laterals are towed behind a doubletree attached to the towing vehicle.

12 Claims, 3 Drawing Figures

PATENTED JUN 10 1975　　　　　3,888,281

SHEET　2

ONE WHEEL PULL-TYPE IRRIGATION SYSTEM

CROSS-REFERENCE TO RELATED APPLICATIONS

None. However, Disclosure Document No. 015,458 was filed on Dec. 14, 1972.

BACKGROUND OF THE INVENTION

1. Field of the Invention

This invention relates to agricultural irrigation systems and more particularly to systems wherein the pipe is moved axially thereof; which systems are called pull-type wheel lateral systems by the U.S. Department of Agriculture in their leaflet No. 476, Revised September 1970, U.S. Government Printing Office 1970-O-382-619.

2. Description of the Prior Art

As indicated by the description in the above mentioned leaflet, pull-type irrigation systems are well known to the art and are commercially available.

Although doubletrees are known in agricultural work, to my knowledge, it has never been suggested that one be used to pull irrigation pipe.

WAGNER U.S. Pat. No. 3,729,140 suggests forming a wheel of two rings or a double ring formed of one-half inch thick round, corrugated steel concrete reinforcing bars.

BLAIR, U.S. Pat. No. 3,448,927, discloses a self-propelled circle move which has a frame including three horizontally aligned pipes, wherein, the wheels are shown journaled either to the center of the three pipes or to one or the other outside pipes.

SUMMARY OF THE INVENTION

1. New and Different Function

I have found that the expense and weight of the system can be improved by using only one wheel per vehicle. The system is ordinarily moved through a muddy field and, therefore, it is desirable to keep the weight of the system to a minimum; therefore, if the wheels can be reduced by half, not only the weight but also the expense of constructing the system are reduced. The torque on the pipe between the vehicles keeps each vehicle upright.

I have found that a satisfactory wheel may be constructed of a ring formed of aluminum tubing.

To decrease the rate at which water is applied to the land, I chose to use two lateral pipes and, also, to move the two laterals at one time, thereby, decreasing the labor involved.

2. Objects of the Inventon

An object of this invention is to irrigate agricultural lands.

Other objects are to achieve the above with a device that is sturdy, compact, durable, lightweight, simple, safe, efficient, versatile, and reliable, yet inexpensive and easy to manufacture, install, adjust, operate, and maintain.

Further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

DESCRIPTION OF THE PREFERRED EMBODIMENT

Figure 1:
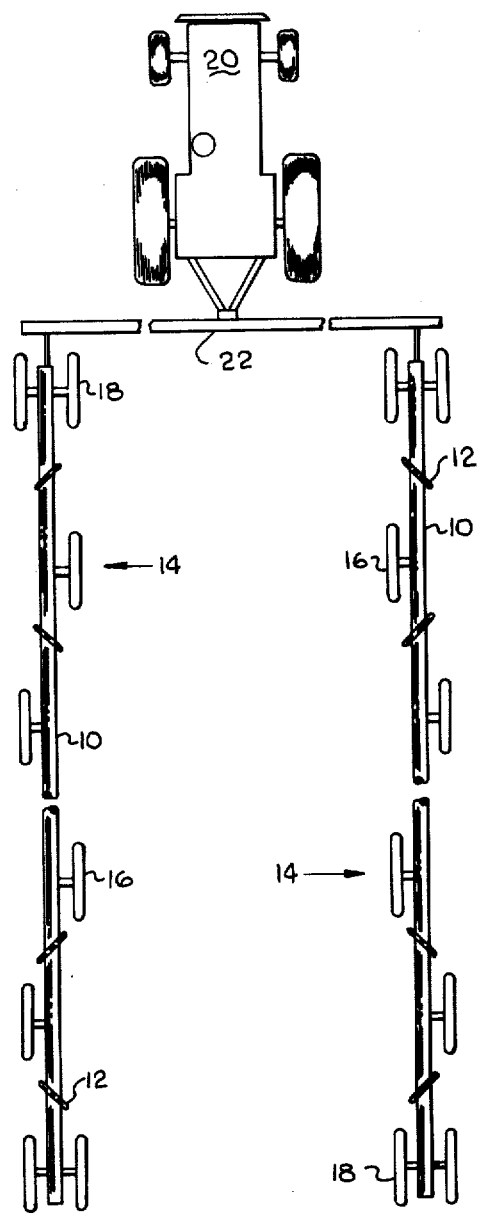
FIG. 1 is a plan view showing a system according to this invention with two lateral lines attached to a tractor by a doubletree.

As seen in the drawing, there is represented elongated pipe 10. As is well known in the art, these pipes are adapted to carry water under pressure and carry a plurality of sprinklers 12 thereupon to discharge water upon the land to be irrigated. The pipe 10 is supported by a plurality of stations or carriages or vehicles 14. Each vehicle has ground engaging wheel 16 so the pipe 10 is movingly supported by the vehicle 14. The intermediate vehicles 14 have only one wheel 16 while the end vehicles 18 are of the cart type, each having two wheels journaled about axles with a common axis.

Referring to FIG. 1, to move the pipes 10 in an axial direction, I provide a single towing vehicle or tractor 20 and doubletree 22. Two elongated pipes 10 are each attached to one of the ends of the doubletree so two lines may be moved simultaneously. The advantages of this are readily seen. If two elongated pipes 10 (called lateral pipes in the agricultural leaflet identified above) are spaced their usual distance apart, they may be moved with half the labor otherwise involved. On the other hand, the farmer may desire to put smaller sprinklers on them and dispurse the water at a slower rate and have the two pipes 10 closer together than would otherwise be economically feasible. In any event, I find there is a greater flexibility of operation and advantage if the doubletree is used. It is contemplated that the doubletree 22 would be about 30 feet in length. (It is shown broken in FIG. 1 for convenience of illustration).

There have been no details of the doubletree construction shown nor the connection between the doubletree 22 and the elongated pipes 10. The prior art, as discussed above, shows that it is well within the knowledge of those skilled in the art how to attach the pipes to be towed behind a tractor. Also, it is within the skill of ordinary farmers to attach a doubletree behind the tractor and to provide hitches on the ends of the doubletree and to attach the pipes thereto. Whether the doubletree were a single beam or reinforced by a truss structure would also be within their skill.

Figure 2:
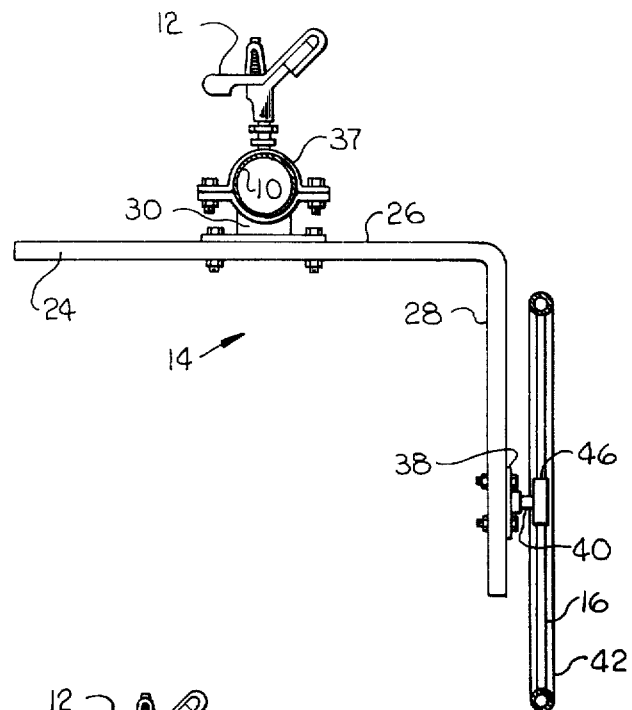
FIG. 2 is a sectional view of the pipe and one vehicle taken substantially on line 2—2 of FIG. 3.
Figure 3:
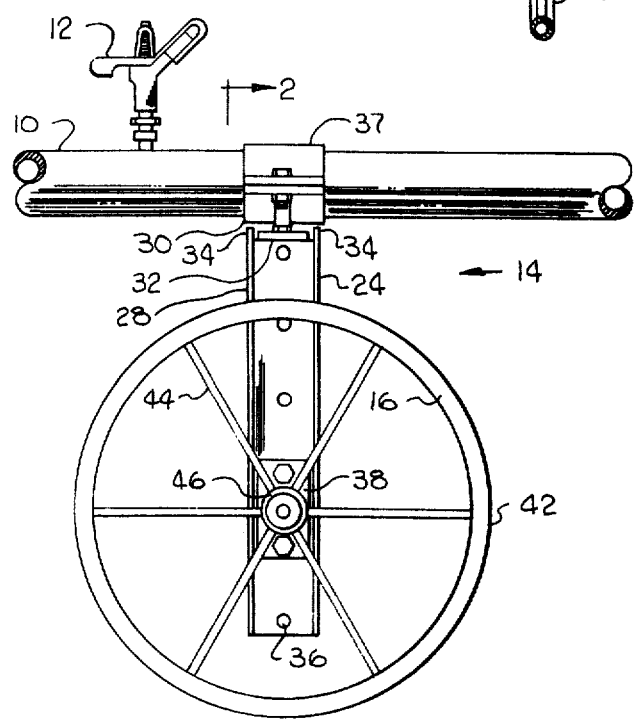
FIG. 3 is a side elevational view of one vehicle on the pipe.

Now referring to FIGS. 2 and 3, each of the vehicles has its principal element frame 24. The frame is made of a channel iron which is bent at right angles so when in use it is in the form of an inverted L, i.e., it has horizontal leg 26 of the channel iron frame 24. There are a plurality of holes 36 through the web 32 of the horizontal leg 26 and, therefore, the saddle 30 may be adjustably spaced along the horizontal leg.

The elongated pipe 10 is securely attached by strap 37 onto the saddle 30. The elongated pipe 10 is secured so it cannot move along its axis, and also the pipe 10 is secured so it cannot rotate about its axis within the saddle 30. This is necessary because with the wheel 16 offset from the center of gravity of the system, the pipe 10 must be torqued so the frame 24, which is basically the vehicle itself, will remain upright.

Likewise, the vertical leg 28 has block 38 adjustably attached thereto, again the block 38 being located between the flanges 34 and against the web 32 of the vertical leg. A plurality of holes 36 in the web also provide for adjustment of the height above the ground.

Stub axle 40 is attached to the block 38. It is oriented normally or at right angles to the axis of the pipe 10. Therefore, the wheel 16 journaled upon the stub axle 40 provides a system whereby the elongated pipe 10 is moved axially, as is common in pull-type lateral systems.

The wheels themselves are conveniently made by having circular rims made of one-inch diameter tubing 42. Each of the rims are supported by a plurality of spokes 44, also made of tubing, radiating from hub 46, which is journaled over the axle 40.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. In an agricultural irrigation system having
   a. an elongated pipe adapted
      i. to carry water under pressure, and
      ii. to discharge the water by sprinklers upon the land to be irrigated,
   b. an end vehicle at each end of the pipe, and
   c. a plurality of intermediate vehicles movingly supporting said pipe;
   d. the improvement in said intermediate vehicles comprising:
   e. each vehicle having only a single wheel,
   f. said wheel contacting the ground to one side of the pipe and spaced therefrom, and
   g. each wheel about equally spaced from wheels along the pipe on the opposite side thereof.
2. The invention as defined in claim 1 wherein said vehicles include
   h. an inverted L-shaped frame,
   j. a pipe attachment means on the horizontal leg of said frame for securing the pipe thereto against rotation of the pipe relative to the frame, and
   k. wheel attachment means on the vertical leg thereof for securing said wheel thereto.
3. The invention as defined in claim 2 with an additional limitation of
   m. said attachment means being adjustable along their respective legs.
4. The invention as defined in claim 3 with additional limitations of
   j. a towing vehicle,
   k. a doubletree attached to the towing vehicle,
   m. two of said elongated pipes attached to the doubletree, whereby
   n. said towing vehicle tows two elongated pipes simultaneously in parallel relationship to each other.
5. The invention as defined in claim 4 wherein said vehicles include
   o. an inverted L-shaped frame,
   p. a pipe attachment means on the horizontal leg of said frame for securing the pipe thereto against rotation of the pipe relative to the frame, and
   q. wheel attachment means on the vertical leg thereof for securing said wheel thereto.
6. The invention as defined in claim 5 with an additional limitation of
   r. said attachment means being adjustable along their respective legs.
7. In an agricultural irrigation system having
   a. an elongated pipe adapted
      i. to carry water under pressure, and
      ii. to discharge the water by sprinklers upon the land to be irrigated,
   b. a vehicle at each end of the pipe, and
   c. a plurality of intermediate vehicles movingly supporting said pipe;
   d. the improvement comprising:
   e. said intermediate vehicles each having one wheel only,
   f. said wheels alternatingly placed, one to one side and one to the other side of the pipe.
8. The invention as defined in claim 7 wherein each of said intermediate vehicles include
   g. an inverted L-shaped frame,
   h. a pipe attachment means on the horizontal leg of said frame for securing the pipe thereto against rotation of the pipe relative to the frame, and
   j. wheel attachment means on the vertical leg thereof for securing said wheel thereto.
9. The invention as defined in claim 8 with an additional limitation of
   k. said attachment means being adjustable along their respective legs.
10. The invention as defined in claim 7 with additional limitations of
    h. a towing vehicle,
    j. a doubletree attached to the towing vehicle,
    k. two of said elongated pipes attached to the doubletree, whereby
    m. said towing vehicle tows two elongated pipes simultaneously in parallel relationship to each other.
11. The invention as defined in claim 10 wherein each of said intermediate vehicles include
    n. an inverted L-shaped frame,
    o. a pipe attachment means on the horizontal leg of said frame for securing the pipe thereto against rotation of the pipe relative to the frame, and
    p. wheel attachment means on the vertical leg thereof for securing said wheel thereto.
12. The invention as defined in claim 11 with an additional limitation of
    q. said attachment means being adjustable along their respective legs.

* * * * *